(12) United States Patent
Carlson et al.

(10) Patent No.: US 7,136,735 B2
(45) Date of Patent: Nov. 14, 2006

(54) ADAPTIVE HILL HOLD FOR AUTOMOBILE APPLICATIONS BY REDUNDANT CLUTCH APPLY

(75) Inventors: Richard W. Carlson, Warren, MI (US); Robert L. Moses, Ann Arbor, MI (US); Zhen Zhang, Canton, MI (US)

(73) Assignee: General Motors Corporation, Detroit, MI (US)

( * ) Notice: Subject to any disclaimer, the term of this patent is extended or adjusted under 35 U.S.C. 154(b) by 356 days.

(21) Appl. No.: 10/899,716

(22) Filed: Oct. 2, 2003

(65) Prior Publication Data
US 2005/0075775 A1 Apr. 7, 2005

(51) Int. Cl.
*G06F 7/00* (2006.01)
(52) U.S. Cl. .............................. 701/51; 477/50; 477/77
(58) Field of Classification Search ................ 701/1, 701/36, 51, 53, 54, 56, 58; 303/20, 192; 477/92, 172, 185, 83, 85, 86, 22, 95, 61, 477/171, 191, 45, 50, 5, 77; 180/65.2
See application file for complete search history.

(56) References Cited

U.S. PATENT DOCUMENTS

| | | | | |
|---|---|---|---|---|
| 5,630,772 A | * | 5/1997 | Tsukamoto et al. | 477/95 |
| 6,039,673 A | * | 3/2000 | Mikami et al. | 477/93 |
| 6,748,311 B1 | * | 6/2004 | Walenty et al. | 701/70 |
| 6,896,340 B1 | * | 5/2005 | Kinser et al. | 303/192 |
| 6,899,212 B1 | * | 5/2005 | Li | 192/219.3 |
| 6,920,383 B1 | * | 7/2005 | Graf et al. | 701/51 |

* cited by examiner

*Primary Examiner*—Richard M. Camby
(74) *Attorney, Agent, or Firm*—Christopher DeVries

(57) ABSTRACT

A vehicle having an automatic transmission includes a roll-back detector that generates a roll-back signal indicating a vehicle roll-back event. A controller receives the roll-back signal and determines whether the automatic transmission is in a forward drive mode having first and second torque transfer elements engaged. The controller engages a third torque transfer element to prevent the vehicle roll-back event.

13 Claims, 4 Drawing Sheets

US 7,136,735 B2

ADAPTIVE HILL HOLD FOR AUTOMOBILE APPLICATIONS BY REDUNDANT CLUTCH APPLY

FIELD OF THE INVENTION

The present invention relates to automatic transmissions, and more particularly to adaptive hill hold control for an automatic transmission.

BACKGROUND OF THE INVENTION

During vehicle travel there are many instances where the vehicle must stop and idle. For example, vehicles stop and idle at traffic signals, cross-walks, stop signs and the like. Vehicles including an automatic transmission can experience a vehicle roll-back event during periods of idle. More specifically, if a vehicle is idling on a surface that has a sufficient grade, the vehicle may be induced to roll backward.

The automatic transmission is driven by the engine through a torque converter. During idle, the torque transferred to the transmission is generally sufficient to enable slight forward rolling of the vehicle (i.e., creeping) when on a flat surface. When on a slight grade, the torque transferred to the transmission is generally sufficient to hold the vehicle at a stand still and prevent vehicle roll-back. On higher grades, however, vehicle roll-back can occur, which causes reverse torque transfer through the transmission.

Conventional methods of detecting and inhibiting vehicle roll-back include automatic control of a vehicle brake system, increased engine torque output and a mechanical brake within the transmission. These methods, however, are more complex and costly than desired.

SUMMARY OF THE INVENTION

Accordingly, the present invention provides a vehicle having an automatic transmission. The vehicle includes a roll-back detector that generates a roll-back signal indicating a vehicle roll-back event. A controller receives the roll-back signal and determines whether the automatic transmission is in a forward drive mode having first and second torque transfer elements engaged. The controller engages a third torque transfer element to prevent the vehicle roll-back event.

In one feature, the roll-back detector includes a bi-directional sensor that senses a rotational direction of an output shaft of the automatic transmission. The bi-directional sensor generates the roll-back signal when sensing a negative rotational direction of the output shaft.

In another feature, the roll-back detector includes a grade sensor and a vehicle speed sensor. The roll-back detector generates the roll-back signal when the grade sensor senses a negative grade and the acceleration sensor senses a negative vehicle acceleration.

In still another feature, the vehicle further includes a hydraulic pump that is driven by the engine. The hydraulic pump provides pressurized hydraulic fluid to the torque transfer elements of the transmission. The controller increases an engine idle speed to increase a capacity of the pump to ensure the torque transfer elements remain engaged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
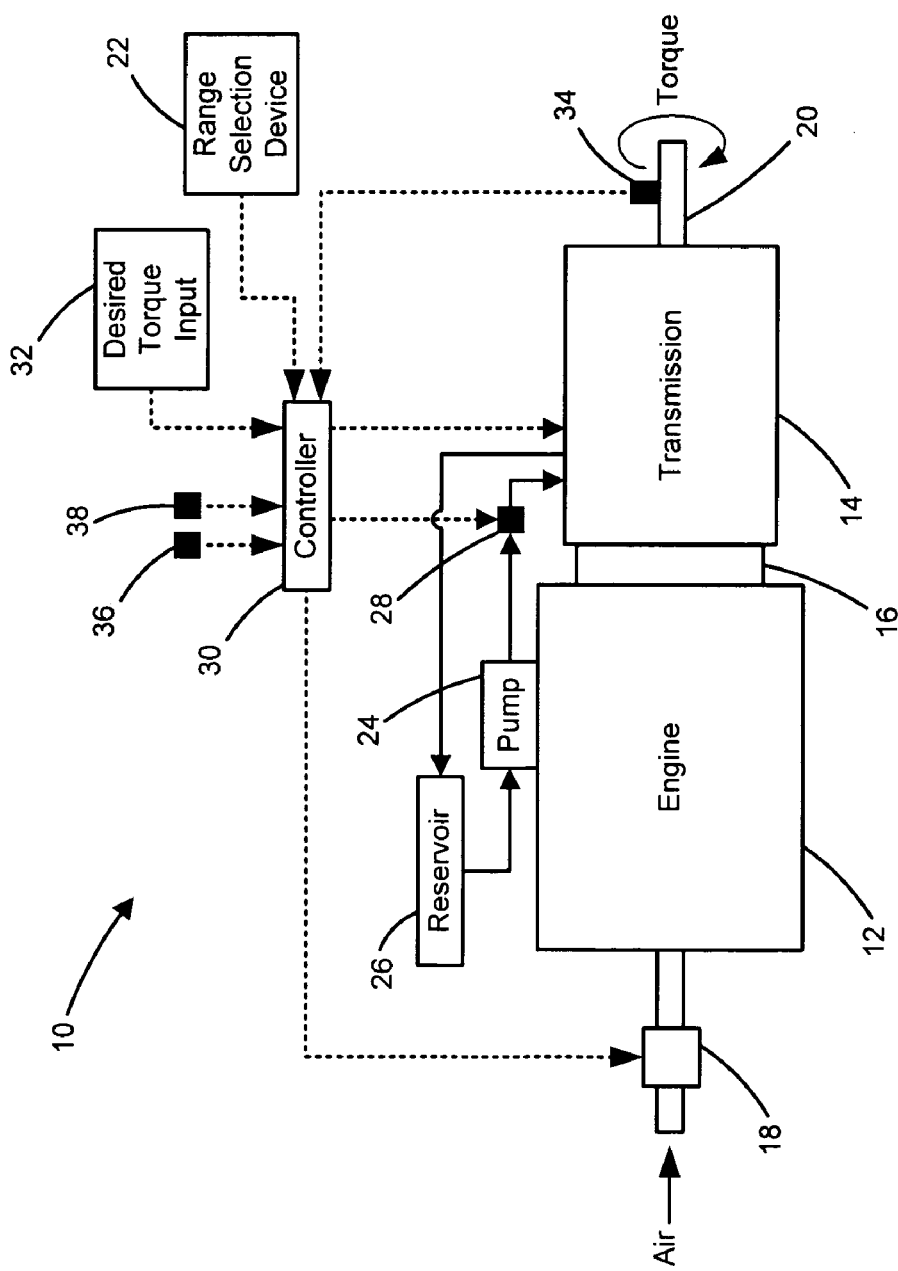
FIG. 1 is a schematic illustration of a vehicle incorporating an adaptive hill hold control according to the present invention.

The following description of the preferred embodiments is merely exemplary in nature and is in no way intended to limit the invention, its application, or uses. For purposes of clarity, the same reference numbers will be used in the drawings to identify similar elements.

Referring now to FIG. 1, a vehicle 10 is schematically illustrated. The vehicle 10 includes an engine 12 that drives a transmission 14 though a torque converter 16. Air is drawn into the engine 12 through a throttle 18. The air is mixed with fuel and combusted within cylinders (not shown) of the engine 12 to produce drive torque. The transmission 14 is a multi-speed automatic transmission that transfers the engine torque at various gear ratios to drive an output shaft 20. A range selection device 22 enables an operator to set the transmission 14 at a desired operating mode including, but not limited to, reverse, neutral and one or more forward drive positions.

As described in further detail below, the transmission 14 includes various hydraulically actuated torque transfer elements including clutches, band brakes, one-way clutches and the like. A hydraulic pump 24 is driven by the engine 12 and draws hydraulic fluid from a reservoir 26. As described in further detail below, the engine speed is regulated to control the capacity of the hydraulic pump 24. If increased hydraulic pressure capacity is required, the engine speed is increased. A regulator valve 28 regulates the supply pressure of hydraulic fluid to the transmission 14.

A controller 30 controls overall operation of the vehicle 10 according to the adaptive hill hold (AHH) control of the present invention. The controller 30 communicates with the engine 12 and the throttle 18 to control and monitor engine operation. The controller 30 communicates with both the range selection device 22 and the transmission 14 to control transmission shifts. The controller communicates with the regulator valve 28 to control the supply pressure of hydraulic fluid to the transmission 14. Further, the controller 30 communicates with an operator controlled desired torque input 32, such as an accelerator pedal. The desired torque input 32 indicates an operator engine torque command.

The controller 30 detects a vehicle roll-back event based on signals generated by a roll-back detector. A vehicle roll-back event occurs when the transmission 14 is in the forward drive mode and is on a sufficient negative incline such that the vehicle 10 is induced to roll backwards even though in a forward drive gear. In other words, the weight of the vehicle 10 induces a negative torque flow through the transmission 14 that is greater than the positive torque flow through the transmission 14. Such an event tends to happen at idle when the transmission 14 is in first gear and the incline is sufficient to overcome the idle torque transferred through the forward gear ratio.

The roll-back detector includes a bi-directional speed sensor 34 that monitors the rotational speed of the output shaft 20 of the transmission 14. A vehicle roll-back event is indicated when the bi-directional speed sensor 34 detects negative rotation of the output shaft 20 when the vehicle 10 is in the forward drive mode. Alternatively, it is anticipated that the roll-back detector can include a grade sensor 36 and an acceleration sensor 38. The grade sensor 36 generates a signal indicating the grade of the surface upon which the vehicle 10 is traveling. The acceleration sensor 38 generates a signal indicating the acceleration of the vehicle 10. A vehicle roll-back event is detected when the grade sensor 36 detects a negative grade and the acceleration sensor 38 detects a negative vehicle acceleration.

Figure 2:
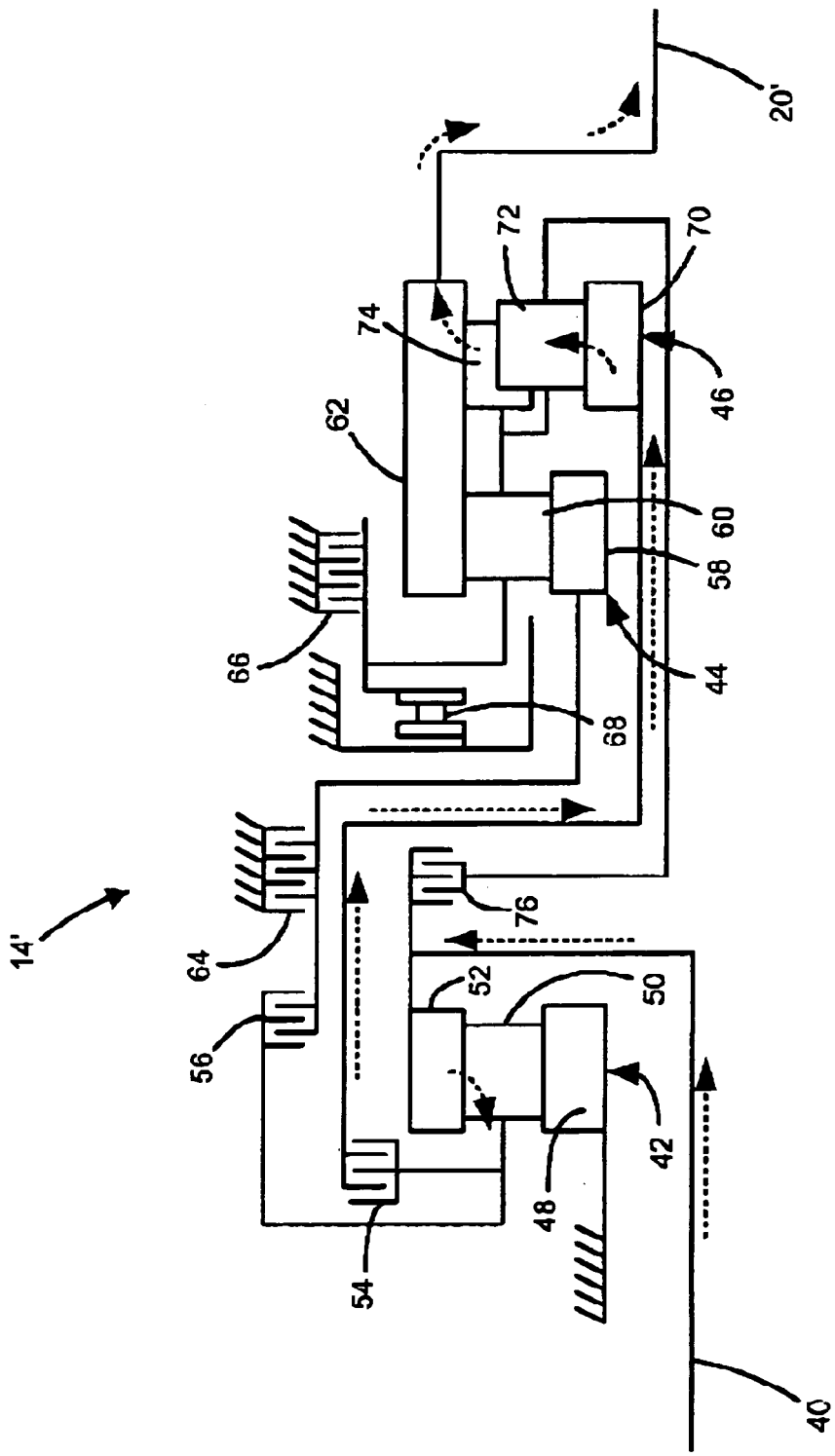
FIG. 2 is a schematic illustration of an exemplary multiple speed automatic transmission.

Referring now to FIG. 2, an exemplary multi-speed, automatic transmission 14' is schematically illustrated. The exemplary automatic transmission 14' is a six-speed transmission including an input shaft 40 that drives an output shaft 20' through first, second and third planetary gear sets 42, 44, 46, respectively. Various torque transfer elements and the first, second and third planetary gear sets 42, 44, 46 are manipulated to provide the six gear ratios and a reverse gear ratio.

The first planetary gear set 42 includes a ring gear 48, a pinion gear/carrier set 50 and a sun gear 52. The ring gear 48 is fixed from rotating and the sun gear 52 is rotatably driven by the input shaft 40. Rotation of the sun gear 52 induces rotation of the pinion gear/carrier 50. A clutch 54 selectively enables the pinion gear/carrier 50 to drive the third planetary gear set 46 and a clutch 56 enables the pinion gear/carrier 50 to drive the second planetary gear set 44.

The second planetary gear set 44 includes a ring gear 58, a pinion gear/carrier 60 and a sun gear 62. The sun gear 62 is shared between the second and third planetary gear sets 44, 46 as explained in further detail below. The ring gear 58 is selectively driven by the pinion gear/carrier 50 of the first planetary gear set 42 through the clutch 56. Additionally, the ring gear 58 is grounded or inhibited from rotating by a clutch 64. The pinion gear/carrier 60 is selectively inhibited from rotating about the ring gear by a clutch 66. Engagement of the clutch 66 grounds the pinion gear/carrier 60. The pinion gear/carrier 60 is also inhibited from rotating in a reverse direction by a one-way clutch 68.

The third planetary gear set 46 is a compound planetary gear set and includes a ring gear 70, a first planetary gear/carrier 72, a second planetary gear/carrier 74 and the sun gear 62. The ring gear 70 is selectively driven by the pinion gear/carrier 50 of the first planetary gear set 42 through the clutch 54. The sun gear 52 of the first planetary gear set drives the first and second pinion gear/carriers through a clutch 76. The first and second pinion gear/carriers 72, 74 are interconnected with the pinion gear/carrier 60 of the second planetary gear set 44. The sun gear 62 is driven by either the second and third planetary gear sets 44, 46 to drive the output shaft 20'.

During idle, the transmission 14 is set in first gear by the controller if the range selector is set in the forward drive mode. Generally, when on a slight incline, the idle torque transferred to the transmission 14 through the torque converter 16 is sufficient to hold the vehicle 10 at a stand-still.

With reference to the exemplary transmission 14', first gear is established by engaging the clutch 54 and interaction of the one-way clutch 68. More particularly, idle torque transferred from the engine 12 through the torque converter 16 rotates the input shaft 20'. Rotation of the input shaft 20' induces rotation of the sun gear 52, driving the pinion gear/carrier 50 through a gear reduction.

With the clutch 54 engaged, rotation of the pinion gear/carrier 50 induces rotation of the ring gear 70. Rotation of the ring gear 70 drives the first and second pinion gear/carriers 72, 74 of the third planetary gear set 46. This, in turn would drive the pinion gear/carrier set 60 of the second planetary gear set 44. However, rotation of the pinion gear/carrier 60 this is inhibited by grounding through the one-way clutch 68. Therefore, the pinion gears of the first and second pinion gear/carriers 72, 74 rotate in place, driving the sun gear 62 and thus, the output shaft 20'. Because the ring gear 58 of the second planetary gear set 44 is free to rotate, the pinion gear of the pinion gear/carrier 60 freely rotates and is driven by the sun gear 62. The torque flow through the exemplary transmission 14' is indicated by the arrows.

Figure 3:
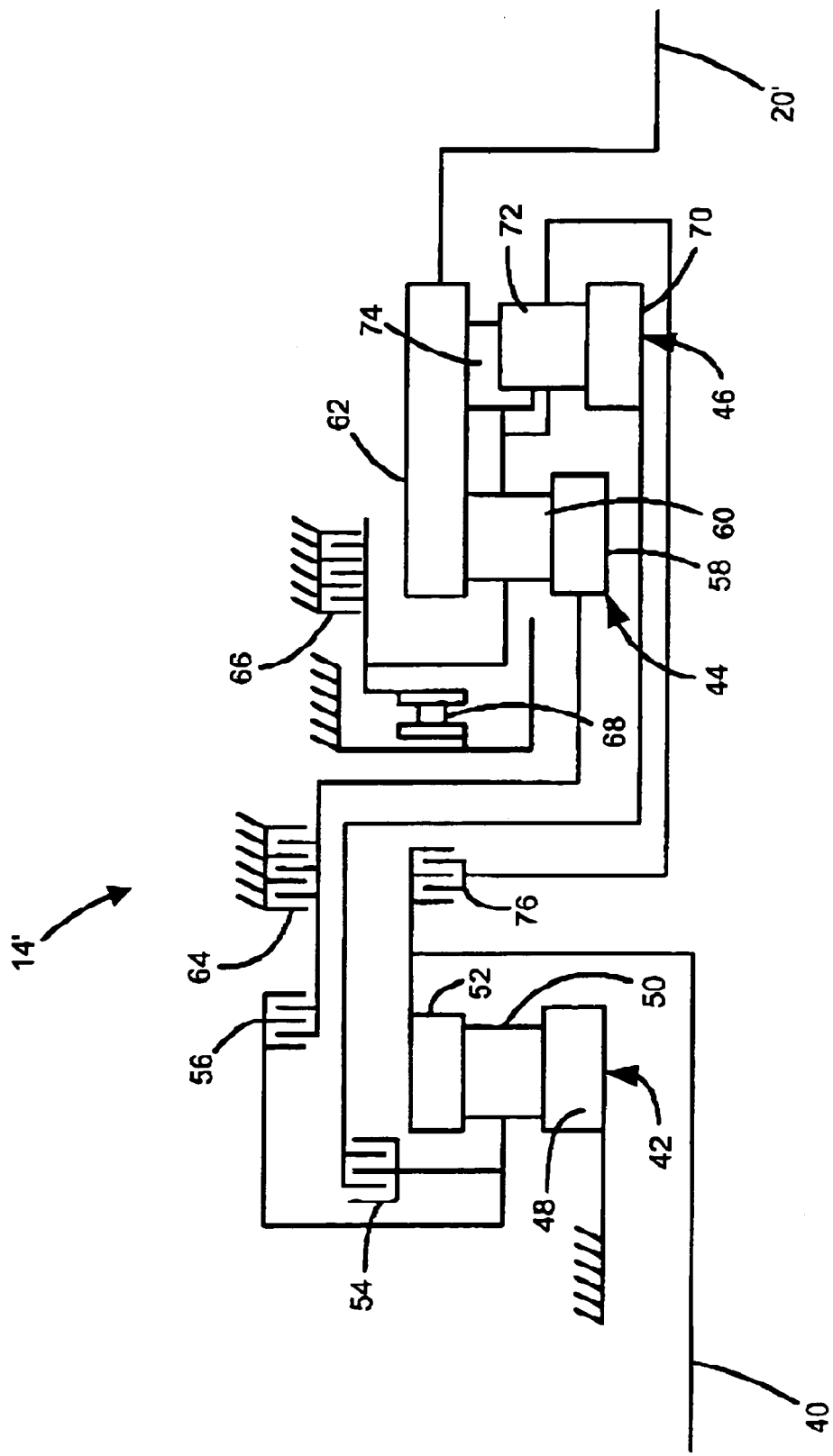
FIG. 3 is a schematic illustration of the exemplary multiple speed automatic transmission of FIG. 4 in a hill hold mode.

Referring now to FIG. 3, the exemplary transmission 14' is shown in a hill hold mode as controlled by the AHH control or the present invention. As discussed above with reference to FIG. 2, forward drive is enable by the interaction of two torque carrying elements, the clutch 54 and the one-way clutch 68. In the hill hold mode, a third torque carrying element is engaged to lock-up the transmission 14', preventing vehicle roll-back. More particularly, the clutch 64 is engaged by the controller 30 upon detecting a vehicle roll-back event. As such, the ring gear 58 is grounded and inhibited from rotating. Therefore, the pinion gear of the pinion gear/carrier 60 is unable to freely rotate and locks-up the sun gear 62 from rotating. Thus, the reverse torque flow through the transmission 14' is inhibited and vehicle roll-back is prevented.

As stated above, the transmission of FIGS. 2 and 3 is merely exemplary of many mutli-speed, automatic transmissions known in the art. It is anticipated that the AHH control of the present invention is applicable to other types of automatic transmissions including two-speed, three-speed, four speed, five-speed, seven-speed and the like. Accordingly, AHH control of the present invention can be readily implemented with conventional transmissions, requiring no additional components.

Figure 4:
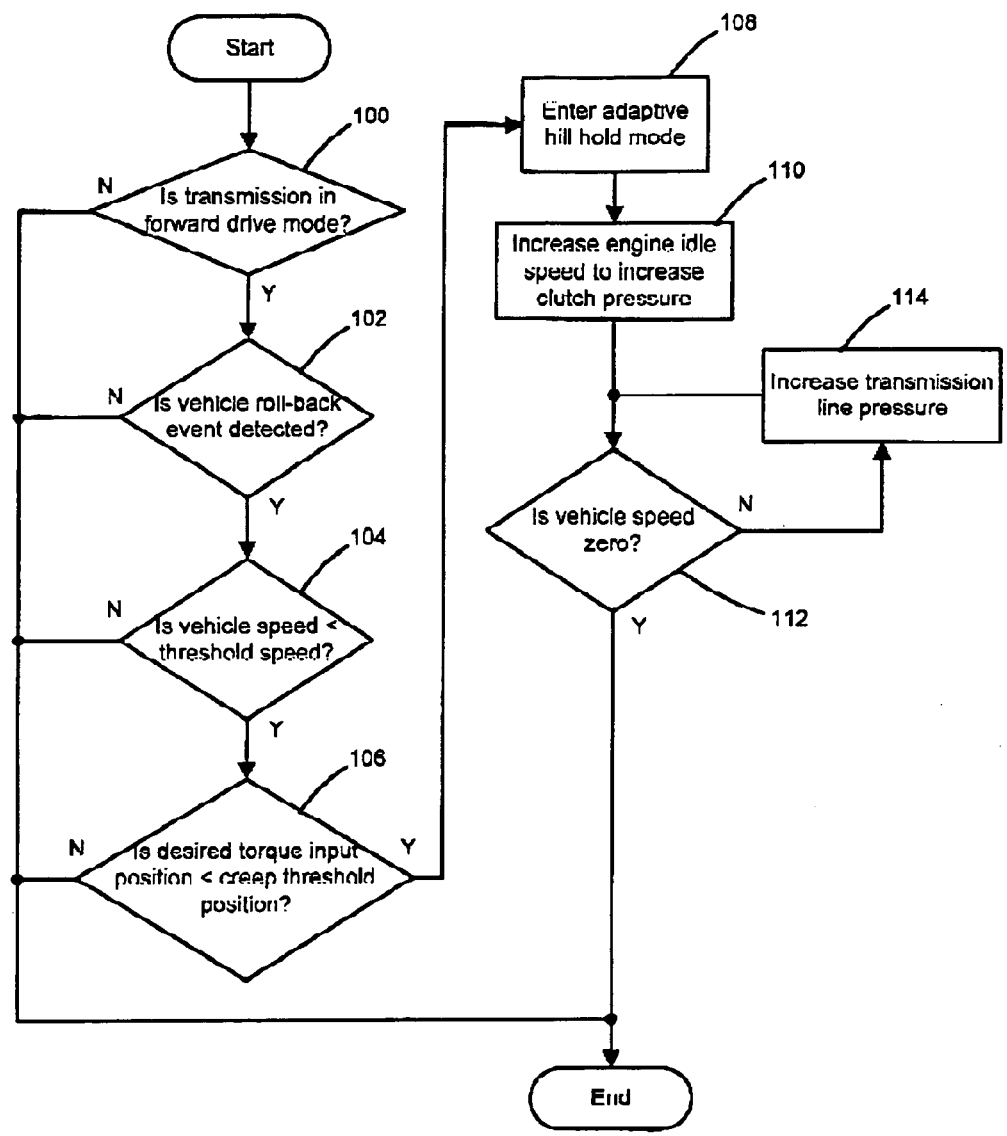
FIG. 4 is a flowchart illustrating steps of the adaptive hill hold control according to the present invention.

Referring now to FIG. 4, the AHH control will be discussed in detail. In step 100, control determines whether the transmission is in the forward drive mode. If not, control ends. If so, control determines whether a vehicle roll-back event is detected in step 102. If no vehicle roll-back event is detected, control ends. If a vehicle roll-back event is detected, control continues in step 104.

In step 104, control determines whether the vehicle speed is less than a threshold speed. Because a vehicle roll-back event has been detected, the vehicle speed is negative (i.e., vehicle is rolling backward). In step 106, control determines whether the desired torque input position (e.g., accelerator pedal position) is less than a creep threshold position. The creep threshold position is the point to which the accelerator pedal is depressed to enable slight forward movement (i.e., creeping) of the vehicle. If the position is not less than the threshold position, control ends. Otherwise control continues in step 108.

In step 108, control enters AHH mode. In AHH mode, control engages the third torque carrying element to lock-up the transmission and inhibit vehicle movement. Control increases engine idle speed to increase the hydraulic fluid pressure available to the transmission in step 110. In step 112, control determines whether the vehicle speed is zero. If so, control ends. Otherwise, control increases the line pressure to the transmission to prevent clutch slipping in step 114 and loops back to step 112.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle having an automatic transmission, comprising:
    a roll-back detector that generates a roll-back signal indicating a vehicle roll-back event, wherein said roll-back detector includes a bi-directional sensor that senses a rotational direction of an output shaft of said automatic transmission; and
    a controller that receives said roll-back signal, that determines whether said automatic transmission is in a forward drive mode having first and second torque transfer elements engaged and that engages a third torque transfer element to prevent said vehicle roll-back event.

2. The vehicle of claim 1 wherein said bi-directional sensor generates said signal when sensing negative rotation of said output shaft.

3. The vehicle of claim 1 further comprising a hydraulic pump that is driven by said engine to provide pressurized hydraulic fluid to said torque transfer elements of said transmission.

4. The vehicle of claim 3 wherein said controller increases an engine idle speed to increase a capacity of said pump to ensure said torque transfer elements remain engaged.

5. A method of preventing vehicle roll-back for a vehicle having an automatic transmission, comprising:
    detecting a vehicle roll-back event by sensing a rotational direction of an output shaft of said automatic transmission, and indicating a vehicle roll-back event when said rotational direction is negative;
    determining whether said automatic transmission is in a forward drive mode having first and second torque transfer elements engaged; and
    engaging a third torque transfer element to prevent said vehicle roll-back event.

6. The method of claim 5 further comprising increasing an engine idle speed to increase a hydraulic pump capacity to ensure said torque transfer elements remain engaged.

7. The method of claim 5 further comprising adjusting a regulator valve to increase line pressure to said automatic transmission.

8. The method of claim 5 further comprising:
    determining whether a vehicle speed is zero; and
    increasing line pressure to said automatic transmission if said vehicle speed is not zero.

9. A method of inhibiting reverse torque input to a transmission of a vehicle, comprising:
    detecting a vehicle rolling direction by sensing a rotational direction of an output shaft of said automatic transmission, and indicating a vehicle roll-back event when said rotational direction is negative;
    determining whether said transmission is in forward drive mode having first and second torque transfer elements engaged;
    comparing a vehicle speed to a threshold speed; and
    engaging a third torque transfer element to prevent said vehicle roll-back event if said transmission is in said forward drive mode and said vehicle speed is less than said threshold speed.

10. The method of claim 9 further comprising comparing a position of a torque input to a creep threshold position, wherein said third torque transfer element is engaged if said position is less than said creep threshold position.

11. The method of claim 9 further comprising increasing an engine idle speed to increase a hydraulic pump capacity to ensure said torque transfer elements remain engaged.

12. The method of claim 9 further comprising adjusting a regulator valve to increase line pressure to said transmission.

13. The method of claim 9 further comprising:
    determining whether a vehicle speed is zero; and
    increasing line pressure to said transmission if said vehicle speed is not zero.

* * * * *